Feb. 2, 1937.    C. H. GERWIG ET AL    2,069,706
OPERATING DEVICE FOR OVEN SHELVES
Filed March 11, 1936    2 Sheets-Sheet 2
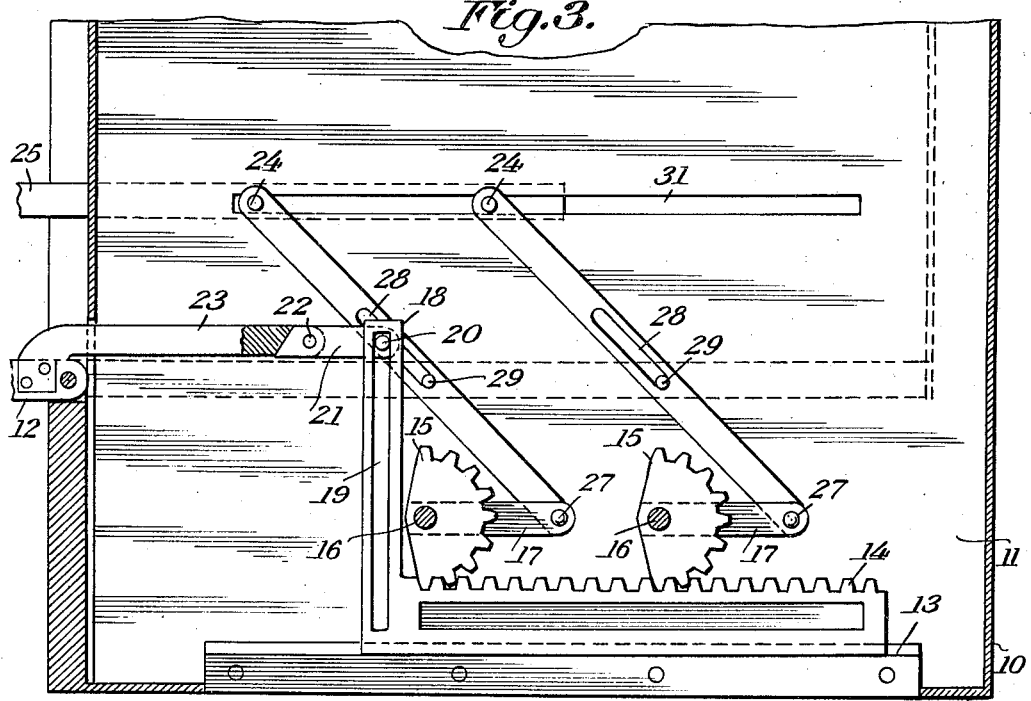
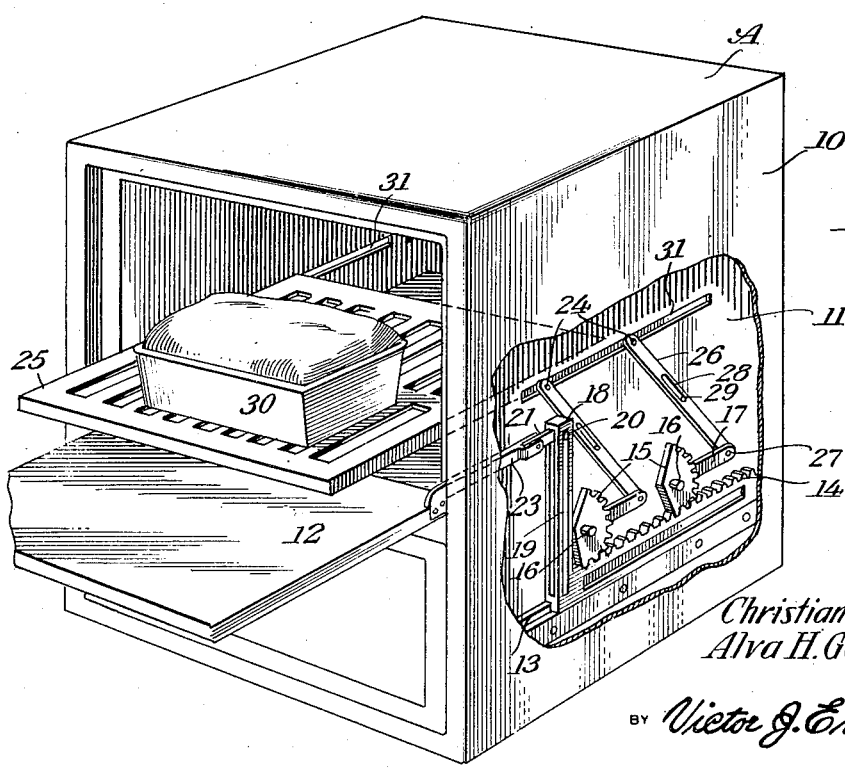
Christian H. Gerwig
Alva H. Gerwig
INVENTOR
BY Victor J. Evans & Co.
ATTORNEYS Patented Feb. 2, 1937

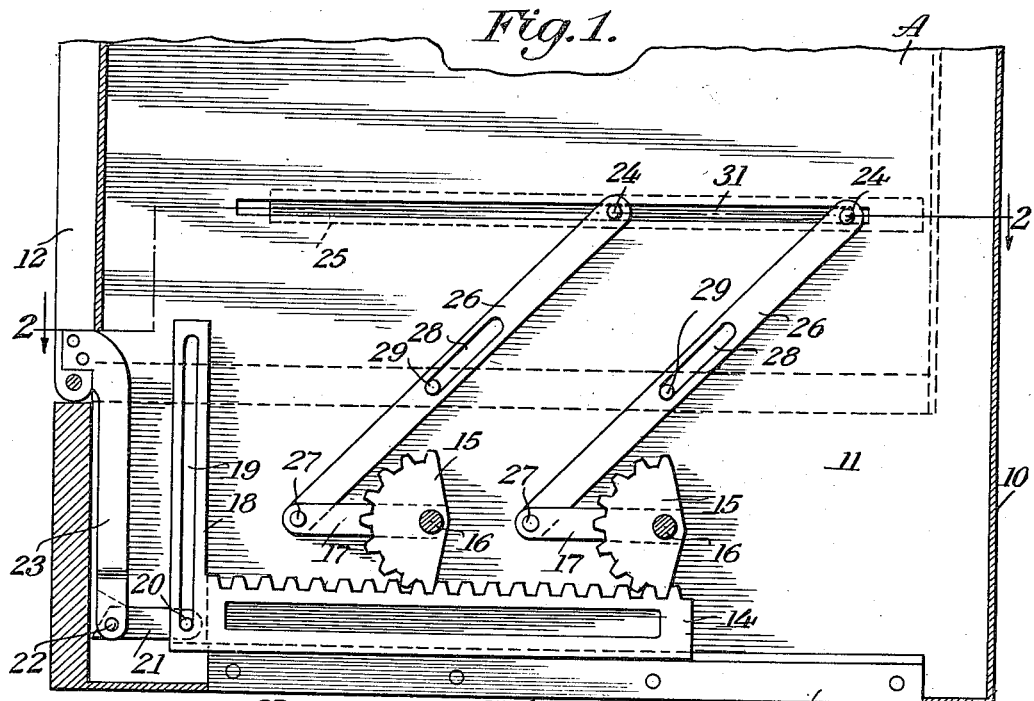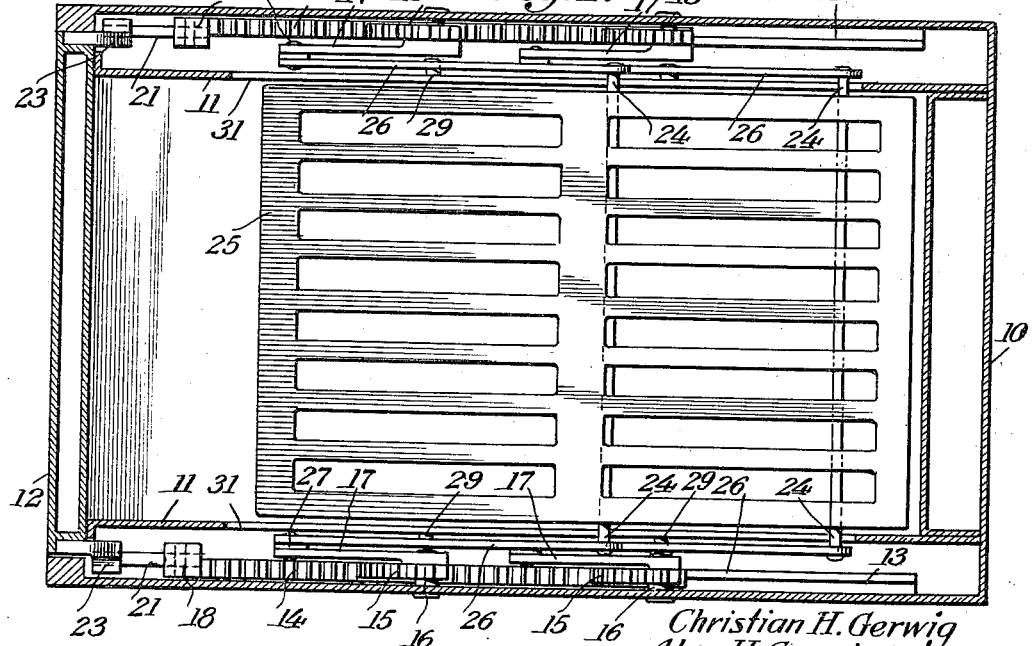

2,069,706

UNITED STATES PATENT OFFICE 2,069,706

OPERATING DEVICE FOR OVEN SHELVES

Christian Harley Gerwig and Alva H. Gerwig, Chapel, W. Va.

Application March 11, 1936, Serial No. 68,314

1 Claim. (Cl. 126—340)

The invention relates to an operating device for oven shelves and more especially to an oven door operated device for the moving of the shelf within the oven.

The primary object of the invention is the provision of a device of this character, wherein on operating the door of an oven the shelf within the said oven will be manipulated to bring the same to a position when the door is opened so that food stuff or material to be baked within the oven can be more readily placed upon the shelf and on the closing of the door the shelf will be carried into the oven, thereby eliminating the necessity of placing the hands within the oven when heated for the handling of the food stuff or material to be baked.

Another object of the invention is the provision of a device of this character, wherein the same is automatically operated on the manual opening and closing of the door of an oven for the projecting and receding of a shelf as within said oven, the device being of novel construction in its entirety.

A further object of the invention is the provision of a device of this character which is simple in construction, thoroughly reliable and efficient in its operation, automatic in action, strong, durable, and inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the claim hereunto appended.

In the accompanying drawings:

Figure 1 is a fragmentary vertical sectional view through an oven showing the device constructed in accordance with the invention installed therein and the oven door being in closed position.

Figure 2 is a sectional view on the line 2—2 of Figure 1 looking in the direction of the arrows.

Figure 3 is a view similar to Figure 1 showing the oven door open and the shelf projected.

Figure 4 is a perspective view of an oven showing its door open and the shelf projected, the oven body being partly broken away for illustrating adjuncts.

Similar reference characters indicate corresponding parts throughout the several views in the drawings:

Referring to the drawings in detail, A designates generally an oven for baking purposes and is formed with an outer casing 10 having interiorly thereof a lining 11 while at the open front of this oven is arranged a vertically swinging door 12 which is manually controlled and is of conventional kind for the closing of the open front of said oven.

Arranged at the bottom of the oven A between the casing 10 and the vertical side walls of the lining 11 and made secure in any suitable manner are horizontally disposed tracks 13 upon which are slidably fitted toothed racks 14, these meshing with segmental gears 15 having their center journals 16 suitably fixed in the side walls of the casing 10 and to these journals are fixed cranks 17, these being for a purpose presently described.

At the forward end of each rack 14 is an upstanding arm 18 having an elongated slot 19 to be traversed by a guide pin 20 of a link 21 pivoted at 22 to a throw lever 23 which is fixed to the door 12. Thus it will be seen that when the door is swung in a vertical direction on its axis the racks 14 will be operated in unison sliding fore and aft on the tracks 13 and thus actuating the gears 15 for the turning of the cranks 17.

Pivoted at 24 to a shelf 25 within the oven A are rocking bars 26, these being also pivoted at 27 to the cranks 17 of the gears 15 and said bars intermediate thereof are provided with elongated slots 28 accommodating guide pins 29 fixed to the vertical walls of the lining 11 so that when the racks 14 are shifted the bars 26 are moved, whereby on the opening of the door 12 the shelf 25 will be projected through the open front of said oven A and on the closing of said door the shelf 25 will be retracted or moved inwardly into the baking compartment or chamber of the oven A as will be clearly apparent from Figures 1, 3 and 4 of the drawings.

The bars 26, gears 15, racks 14 and tracks 13 are located between the vertical side walls of the casing 10 and the vertical side walls of the lining 11 of the oven A. Also the levers 23 operate through suitable clearances between the said walls on actuating the door 12 as before described.

By the foregoing arrangement a baking pan or other container 30 containing the material to be baked will be conveniently brought into proximity to the operator of the door on the opening of the said door 12 and also will be conveniently placed within the baking compartment or chamber in the oven A when the door is closed.

The vertical walls of the lining 11 within the oven A are provided with slots 31 forming guide ways for the pivots 24 connecting the bars 26 with the shelf 25.

What is claimed is:

The combination with an oven having a front vertical swinging door, a shelf movably supported within the oven, rocking bars pivoted to said shelf, cranked gears pivoted to said bars, shiftable racks operating said gears, arms carried by said door, slotted upstanding extensions on the racks, and links pivoted to the arms and slidably connected in the slots of the upstanding extensions.

CHRISTIAN HARLEY GERWIG.
ALVA H. GERWIG.